(12) United States Patent  
Reichholf et al.

(10) Patent No.: US 11,862,823 B2  
(45) Date of Patent: Jan. 2, 2024

(54) FUEL CELL SYSTEM AND METHOD FOR RECIRCULATION OF EXHAUST GAS IN A FUEL CELL SYSTEM

(71) Applicant: AVL List GmbH, Graz (AT)

(72) Inventors: David Reichholf, Graz (AT); Rene Buchgraber, Gleisdorf (AT); Richard Schauperl, Graz (AT)

(73) Assignee: AVL List GmbH, Graz (AT)

( * ) Notice: Subject to any disclaimer, the term of this patent is extended or adjusted under 35 U.S.C. 154(b) by 226 days.

(21) Appl. No.: 17/297,477

(22) PCT Filed: Nov. 27, 2019

(86) PCT No.: PCT/AT2019/060402  
§ 371 (c)(1),  
(2) Date: May 27, 2021

(87) PCT Pub. No.: WO2020/107047  
PCT Pub. Date: Jun. 4, 2020

(65) Prior Publication Data  
US 2022/0052360 A1 Feb. 17, 2022

(30) Foreign Application Priority Data  
Nov. 27, 2018 (AT) .............................. A 51048/2018

(51) Int. Cl.  
*H01M 8/04119* (2016.01)  
*H01M 8/04029* (2016.01)  
*H01M 8/04746* (2016.01)

(52) U.S. Cl.  
CPC ... *H01M 8/04119* (2013.01); *H01M 8/04029* (2013.01); *H01M 8/04753* (2013.01)

(58) Field of Classification Search  
CPC ......... H01M 8/04029; H01M 8/04119; H01M 8/04753  
See application file for complete search history.

(56) References Cited

U.S. PATENT DOCUMENTS

2008/0289955 A1* 11/2008 Balestrino ............. H01M 8/186  
204/274  
2010/0062299 A1* 3/2010 Son ..................... H01M 8/0612  
429/425  
(Continued)

FOREIGN PATENT DOCUMENTS

AT 519848 10/2018  
DE 4234151 4/1993  
(Continued)

*Primary Examiner* — Scott J. Chmielecki (57) ABSTRACT

The present invention relates to a fuel cell system (100) comprising at least one fuel cell stack (1) having at least one cathode section (K) and at least one anode section (A), an air supply section (2) for supplying air (2) to the anode section (A) of the fuel cell stack (1), an exhaust air section (4) for discharging exhaust air (5) from the anode section (A) of the fuel cell stack (1), as well as a supply section (7) for supplying at least one main medium (6) to the cathode section (K) of the fuel cell stack (1), an exhaust gas discharge section (9) for discharging exhaust gas (8) from the cathode section (K) of the fuel cell stack (1), as well as a pump (12) for delivering the at least one main medium (6), the exhaust gas discharge section (9) being fluidically connected via a recirculation section (14) to the supply section (7) downstream of the pump (12) in order to recirculate exhaust gas (8), the recirculation section (14) being connected via a jet pump (16) to the supply section (7) in order to introduce recirculated exhaust gas (8) as the secondary flow (20) of the jet pump (16) into the at least one gaseous main medium (6) as the primary flow (18) of the jet pump (16). The invention also relates to a method for recirculating exhaust gas (8) in a fuel cell system (100).

14 Claims, 4 Drawing Sheets

(56) References Cited

U.S. PATENT DOCUMENTS

| | | | | |
|---|---|---|---|---|
| 2012/0214076 A1* | 8/2012 | Hakala | .............. | H01M 8/04097 429/444 |
| 2015/0318562 A1* | 11/2015 | Hausmann | ........ | H01M 8/04097 429/457 |
| 2016/0093905 A1* | 3/2016 | Lucas | .................... | H01M 8/06 429/512 |
| 2016/0190617 A1* | 6/2016 | Haase | ..................... | B60L 50/72 429/439 |
| 2017/0054168 A1* | 2/2017 | Budge | ................. | B01D 53/864 |
| 2017/0244120 A1* | 8/2017 | Holladay | ................ | F25J 1/0227 |
| 2017/0305297 A1* | 10/2017 | Kim | ................... | H01M 8/0488 |

FOREIGN PATENT DOCUMENTS

| | | | | |
|---|---|---|---|---|
| DE | 102017100163 A1 * | 7/2018 | ........ | H01M 8/04014 |
| EP | 1957694 | 8/2008 | | |
| EP | 3050148 | 8/2016 | | |
| EP | 3378972 | 9/2018 | | |
| WO | WO 2007/063272 | 6/2007 | | |

* cited by examiner

FUEL CELL SYSTEM AND METHOD FOR RECIRCULATION OF EXHAUST GAS IN A FUEL CELL SYSTEM

RELATED APPLICATIONS

This application is a National Phase of PCT Patent Application No. PCT/AT2019/060402 having International filing date of Nov. 27, 2019, which claims the benefit of priority of Austrian Patent Application No. A51048/2018 filed on Nov. 27, 2018. The contents of the above applications are all incorporated by reference as if fully set forth herein in their entirety.

FIELD AND BACKGROUND OF THE INVENTION

The present invention relates to a fuel cell system comprising a recirculation section for recirculating exhaust gas and a jet pump, and to a method for recirculating exhaust gas in a fuel cell system.

Fuel cell systems in which a pre-heated fluid is recirculated in order to control the temperature of a section or component upstream or to influence the gas mixture are known in the prior art. For example, DE 10 2006 037 799 A1 and DE 10 2015 213 913 A1 each disclose a device for recirculating anode gas of a fuel cell. In particular, it is known in the prior art that the exhaust gases of a regeneratively operated fuel cell (SOEC) are recirculated by means of recirculation fans. In high-temperature electrolysis with SOEC fuel cell stacks, gas, in particular water vapour and carbon dioxide, is fed in on the fuel side. A reducing atmosphere is desirable in order to prevent degradation on account of oxidation of the components on the fuel side. Recirculation of the exhaust gas of an SOEC to the supply section of the fuel side by means of a recirculation fan can generate a reducing atmosphere. However, the disadvantage of the known solutions is that a recirculation fan has a limited operating temperature range, since the components of a recirculation fan, in particular the bearings and the lubrication, are sensitive to temperature and require additional cooling. Furthermore, fans of this kind reduce the efficiency of the system, because they are inefficient and use up a lot of electrical energy in relation to the benefits they provide.

SUMMARY OF THE INVENTION

The object of the present invention is to address the problem described above at least in part. In particular, the object of the present invention is to provide a fuel cell system comprising a recirculation section for recirculating exhaust gas and a jet pump as well as to provide a method for recirculating exhaust gas in a fuel cell system that has a greater tolerance to high temperatures.

The object outlined above is achieved by means of the patent claims. In particular, the object outlined above is achieved by the fuel cell system according to claim 1 and the method according to claim 12. Additional advantages of the invention can be derived from the dependent claims, the description and the drawings. Features and details that are described in connection with the fuel cell system naturally also apply in connection with the method according to the invention for recirculating exhaust gas in a fuel cell system and vice versa, and therefore reference is and can be made interchangeably to the disclosure of the individual aspects of the invention.

According to a first aspect of the present invention, a fuel cell system comprising a recirculation section for recirculating exhaust gas and a jet pump is provided. The fuel cell system comprises at least one fuel cell stack having at least one cathode section and at least one anode section. The fuel cell system also comprises an air supply section for supplying air to the anode section of the fuel cell stack, an exhaust air section for discharging exhaust air from the anode section of the fuel cell stack, a supply section for supplying at least one main medium, in particular a gaseous main medium, to the cathode section of the fuel cell stack, and an exhaust gas discharge section for discharging an exhaust gas from the cathode section of the fuel cell stack. The fuel cell system also comprises a pump for delivering the at least one main medium, the exhaust gas discharge section being fluidically connected via a recirculation section to the supply section downstream of the pump in order to recirculate exhaust gas, the recirculation section being connected via a jet pump to the supply section in order to introduce recirculated exhaust gas as the secondary flow of the jet pump into the at least one main medium as the primary flow of the jet pump.

A fuel cell system according to the invention therefore comprises a recirculation section for recirculating exhaust gas and a jet pump. A jet pump comprises at least two inlets and at least one outlet for connection to lines that convey fluid or other components. A jet pump functions in such a way that a primary flow flows from a first inlet of the jet pump to the outlet of the jet pump. A secondary flow is fed to the primary flow through a second inlet of the jet pump. The primary flow experiences a pressure drop and acceleration in the jet pump. On account of the suction effect of the primary flow, the secondary flow is also accelerated, the flows mix and then exit mixed through the outlet of the jet pump. On account of the suction effect inside the jet pump, no additional conveying apparatus is required in the secondary flow. In the fuel cell system according to the invention, the recirculated exhaust gas is mixed as the secondary flow with the main medium as the primary flow by means of a jet pump. The recirculation section does not need to comprise any additional conveying apparatus in addition to the jet pump in order to recirculate the exhaust gas. However, as explained below, the recirculation section may comprise additional controlling and/or conveying components and/or component groups. The outlet of the jet pump may be connected to the supply section of the cathode section of the fuel cell stack either directly or by means of lines. According to the invention, the main medium is gaseous or substantially gaseous at the latest as it enters the cathode section of the fuel cell stack. A jet pump is particularly advantageous in comparison to a recirculation fan due to the fact that it has a much wider operating temperature range. A jet pump preferably comprises no moving components, and therefore no maintenance work is required for the jet pump. A pump of the fuel cell system delivers the main medium to the jet pump and additionally generates a desired pressure level of the main medium. A fuel cell system designed in this manner advantageously makes it possible to recirculate exhaust gas by means of a recirculation section and a jet pump. As a result, an advantageous reducing atmosphere can be created in the supply section of the fuel cell stack from within the fuel cell system itself, i.e. without any additional useful gases being introduced, and a greater temperature tolerance and a high functional reliability of the components can be ensured at the same time. The system efficiency is therefore improved in the fuel cell system according to the invention.

According to an advantageous development of the present invention, it is possible for an evaporator unit for generating at least one gaseous main medium from at least one liquid main medium to be arranged between the pump and the jet pump in a fuel cell system. Advantageously, water is used as the liquid main medium within the scope of the invention, and therefore the gaseous main medium is water vapour. A fuel cell system designed in this manner makes it possible to increase the pressure of the main medium in the liquid state by means of the pump before it is evaporated by the evaporator unit. This allows for a particularly advantageous and efficient pressure increase of the main medium and less energy and expense is required in comparison to increasing the pressure of the main medium in the gaseous state.

According to a particularly advantageous development of the present invention, it is possible for the evaporator unit in a fuel cell system to be designed as a multi-stage, in particular two-stage, evaporator unit. A corresponding evaporator unit may be adapted to the requirements of the fuel cell system and, as a result, the efficiency of the fuel cell system can be increased and the costs for material and work can be reduced.

According to another advantageous development of the present invention, it is possible for the evaporator unit in a fuel cell system to be an electric evaporator unit or a heat-exchange evaporator unit, the heat-exchange evaporator unit being heated in particular by the exhaust gas and/or the exhaust air of the fuel cell system. An additional adaptation of the evaporator unit can therefore determine the technical manner in which the evaporation is implemented. For example, the main medium may be evaporated by supplying electrical energy by means of an electric evaporator unit and, additionally or alternatively, by means of heat energy from the fuel cell system itself, for example. A user can therefore advantageously choose which resource to use for evaporating the main medium and, as such, available resources can be utilised in an optimal manner and the efficiency of the fuel cell system can be increased.

According to another advantageous development of the present invention, it is possible for a first heat exchanger for heating at least one liquid main medium to be arranged between the pump and the jet pump in a fuel cell system, the at least one heated main medium being heated by means of the first heat exchanger such that the heated main medium evaporates on account of the pressure drop in the jet pump. According to this embodiment of the invention, as an alternative to the paragraphs above, the liquid main medium is not evaporated by means of an evaporator unit, but rather by means of at least one first heat exchanger. The liquid main medium is then heated to a temperature just below the evaporation temperature such that the main medium evaporates on account of the pressure drop upon entry into the jet pump, which decreases the evaporation temperature of the main medium. Additionally, the evaporation process can be facilitated by means of the heat energy from the admixed secondary flow, which, as an exhaust gas flow from the fuel cell stack, has a high temperature in normal operation. As a result, the costs and effort for an evaporator unit can be reduced to the lower costs and effort for at least one first heat exchanger.

According to a development of the present invention, it is possible for at least one second heat exchanger, in particular comprising a catalyst, for heating the main medium, in particular the gaseous main medium, to be arranged between the jet pump and the supply section of the fuel cell stack in a fuel cell system. As a result, in the fuel cell system according to the invention, the mixed primary and secondary flows can be heated by means of a heat exchanger downstream of, i.e. after, the outlet of the jet pump, and upstream of, i.e. before, the supply section of the cathode section of the fuel cell stack. By virtue of a heat exchanger arranged in this manner, the gas mixture consisting of the primary and secondary flow from the jet pump can be heated to an optimal temperature for the fuel cell stack and the efficiency of the fuel cell system can advantageously be increased.

In an advantageous embodiment variant of the fuel cell system according to the invention, it is possible for at least one first valve to be arranged on the recirculation section, in particular at the transition from the recirculation section to the jet pump, in order to adjust a recirculation rate of the exhaust gas. In addition to the design features of the jet pump, the recirculation rate of the exhaust gas can also be regulated by means of at least one first valve. The internal diameters of a jet pump along with the friction losses of the recirculation section are decisive for the recirculation rate of the fuel cell system. However, the diameters of the jet pump are constant and can only be altered with significant technical effort. By means of at least one first valve, the recirculation rate of the fuel cell system can advantageously be adapted and optimised.

In another advantageous embodiment variant of the fuel cell system according to the invention, it is possible for the jet pump to comprise at least one second valve for adjusting the primary flow and/or the secondary flow. Analagously to the previous paragraph, the ratio of primary flow to secondary flow can be adjusted and advantageously adapted and optimised by means of at least one second valve. Alternatively or additionally, the ratio of primary flow to secondary flow may be set by means of the constructive design of the internal diameters of the jet pump. However, by using at least one second valve, it is possible to adjust the flow ratios and the high functional reliability of the jet pump can be maintained due to the absence of moving components.

In another advantageous embodiment variant of the fuel cell system according to the invention, it is possible for the air supply section to comprise an air supply fan for adjusting an amount of air conveyed in the air supply section. Air is used in the anode section of a fuel cell system according to the invention to remove or transport away the oxygen created by the splitting of water/carbon dioxide. The air exits the anode section of the fuel cell system enriched with oxygen during operation. An air supply fan may advantageously be provided in order to control the amount of air in the air supply section and/or the amount of exhaust air in the exhaust air section and to optimise the fuel cell system.

In addition, it is possible in a fuel cell system of the present invention for a useful gas supply section of the fuel cell system to supply the primary flow and/or secondary flow of the jet pump with at least one additional gas or gas mixture, in particular from a storage volume, and/or recirculated exhaust air, in particular via an additional recirculation section, from the exhaust air section. A fuel cell system designed in this manner constitutes another advantageous variant for possibly increasing the temperature, for example, of the primary flow or for further influencing the gas mixture within the context of the invention via, for example, a recirculation section from the exhaust air section to the jet pump. On account of this additional recirculation section, oxygen can be dosed into the primary flow. This adjustable amount of oxygen can then react with the exhaust gas, which is also recirculated, and the primary flow and thus ensure highly efficient heat input. The reaction can be accelerated by components having catalyst coatings. However, if these are provided, it should be ensured that the proportion of reducing gases required for the fuel cell stack is maintained. Alternatively or additionally, a useful gas, in particular from a storage volume, may be supplied to the primary and/or secondary flow.

It is also advantageous if a recirculation fan is arranged in the recirculation section of a fuel cell system according to the invention in order to adjust an amount of the exhaust gas of the fuel cell stack recirculated in the recirculation section. In spite of the fact that, by virtue of the jet pump, no additional conveying means are required for recirculating the exhaust gas, a recirculation fan may be integrated in the fuel cell system as an additional solution in order to provide an additional boost.

According to another aspect of the present invention, a method is provided for recirculating exhaust gas in a fuel cell system according to the first aspect. The method comprises the following steps:

delivering the main medium by means of the pump,
supplying air via the air supply section to the anode section of the fuel cell stack, supplying the main medium via the supply section to the cathode section of the fuel cell stack,
recirculating the exhaust gas from the exhaust gas discharge section of the cathode section via a recirculation section to the supply section of the cathode section,
mixing the recirculated exhaust gas as the secondary flow with the main medium as the primary flow in the jet pump,
supplying the mixed primary flow and secondary flow via the supply section to the cathode section of the fuel cell stack.

Depending on the embodiment of the fuel cell system, a method according to the invention may provide for delivery of the main medium by means of the pump to an evaporator unit and/or at least one first heat exchanger, for example. A method designed in this manner makes it possible to recirculate exhaust gas by means of a recirculation section and a jet pump. As a result, an advantageous reducing atmosphere can be created in the supply section of the fuel cell stack from within the fuel cell system itself and, at the same time, a high temperature tolerance and a high functional reliability of the components can be ensured. A method according to the invention therefore produces the same advantages as those described in detail above. The above-mentioned steps can be carried out in the order given or in any other order. The method steps can be carried out once or multiple times as well as in series or in parallel. The method according to the invention increases the system efficiency of the fuel cell system.

In an advantageous development of the present invention, it is possible in a method for the recirculation rate of the fuel cell system to be controlled by means of a control unit. A control unit may comprise at least one sensor, an evaluation unit, a computing unit and a regulation unit. Controlling the recirculation rate of the fuel cell system constitutes an advantageous extension of the method according to the invention, since a user is given the option to control, to adapt as they see fit and to optimise the fuel cell system.

BRIEF DESCRIPTION OF THE SEVERAL VIEWS OF THE DRAWINGS

Other measures that improve the invention can be deduced from the following description of various exemplary embodiments of the invention, which are represented schematically in the figures, in which.

DESCRIPTION OF SPECIFIC EMBODIMENTS OF THE INVENTION

Elements having the same function and mode of operation are in each case denoted by the same reference signs in FIGS. 1 to 4.

Figure 1:
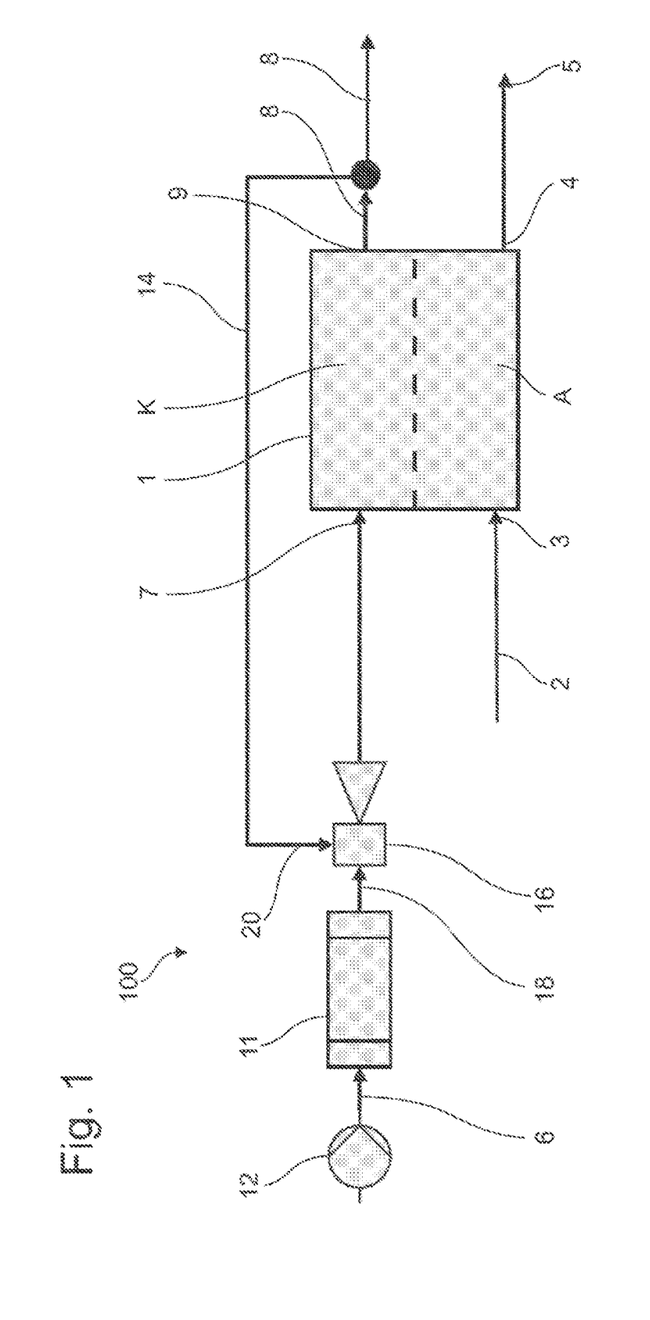
FIG. 1 is a circuit diagram of a fuel cell system comprising a jet pump, a recirculation section and an evaporator unit.

FIG. 1 is a schematic circuit diagram of a fuel cell system 100 according to the invention comprising a jet pump 16, a recirculation section 14 and an evaporator unit 11. The main medium 6 is conveyed from the pump 12 to the evaporator unit 11 and pressurised. The gaseous main medium 6 enters the jet pump 16 as the primary flow 18 downstream of the evaporator unit 11. The exhaust gas 8 recirculated via the recirculation section 14 enters the jet pump 16 as the secondary flow 20. The primary flow 18 experiences a pressure drop and is accelerated in the jet pump 16. The secondary flow 20 is accelerated by the primary flow 18 in the jet pump 16 and both flows 18, 20 exit the jet pump 16 mixed together. The mixed flows 18, 20 enter the cathode section K of the regeneratively operated fuel cell stack 1 via the supply section 7 downstream of the jet pump 16. Air 2 is delivered to the anode section A via the air supply section 3. Exhaust gas 8 exits the exhaust gas discharge section 9. If water is used as the main medium 6, hydrogen-rich exhaust gas 8, for example, exits the exhaust gas discharge section 9. Some of the exhaust gas 8 is recirculated via the recirculation section 14. Exhaust air 5 enriched with oxygen exits the exhaust air section 4. A fuel cell system 100 designed in this manner allows for an advantageous reducing atmosphere in the supply section 7 of the fuel cell stack 1 from within the fuel cell system 100 itself and, at the same time, a high temperature tolerance and a high functional reliability of the components can be ensured.

Figure 2:
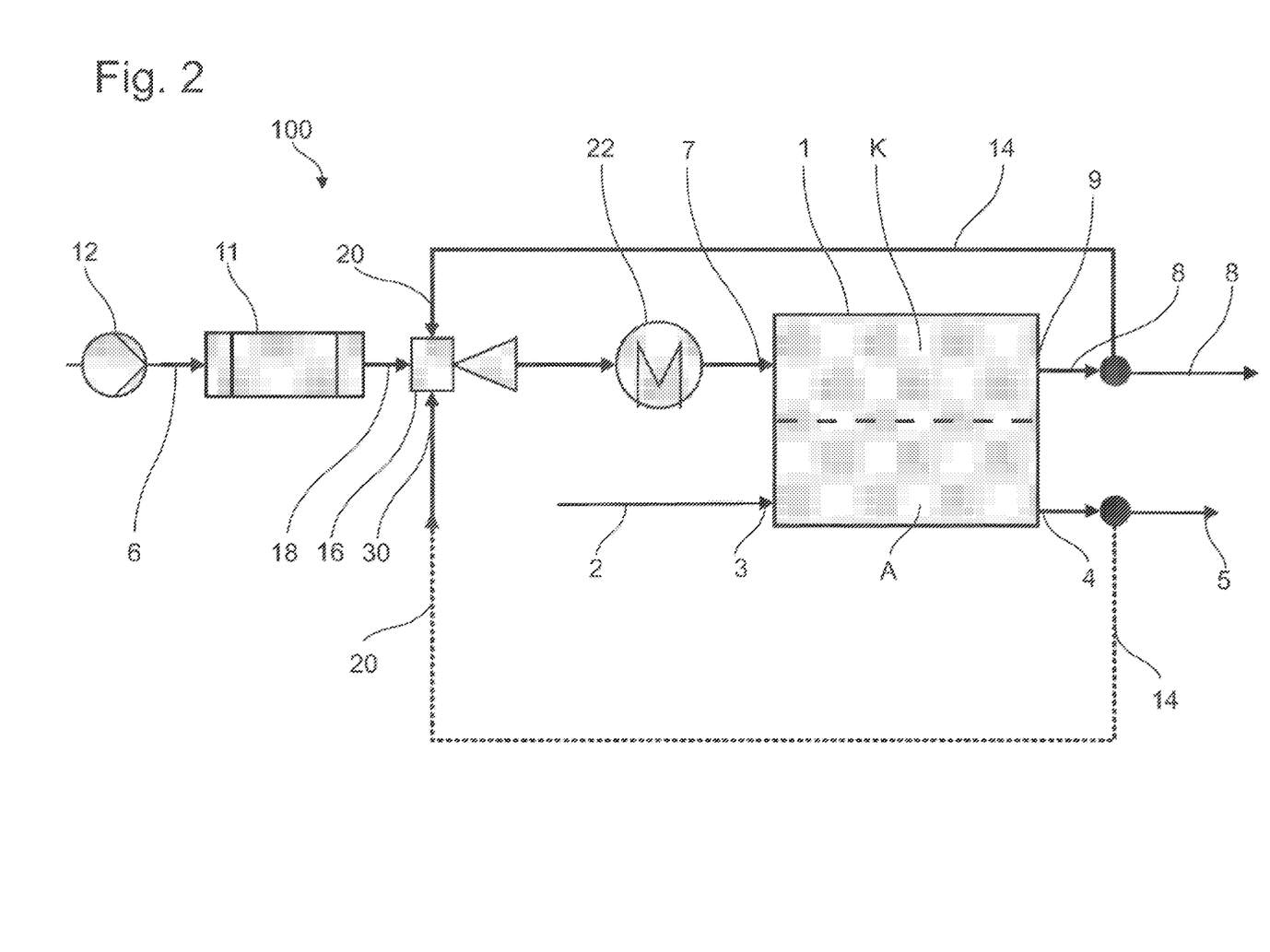
FIG. 2 is a circuit diagram of a fuel cell system comprising a jet pump, a recirculation section, an evaporator unit, a second heat exchanger and an additional recirculation section.

FIG. 2 is a schematic circuit diagram of a fuel cell system 100 according to the invention comprising a jet pump 16, a recirculation section 14, an evaporator unit 11, a second heat exchanger 22 and an additional recirculation section 14 for recirculating exhaust air 5. Building on the description of FIG. 1, FIG. 2 shows exhaust air 5 being introduced into the jet pump 16 via an additional recirculation section 14 as a second secondary flow 20. This secondary flow 20 is, like the first secondary flow 20, also accelerated by the primary flow 18 in the jet pump 16 and exits the jet pump 16 mixed together with the primary flow 18. The embodiment of the fuel cell system 100 from FIG. 2 also shows a second heat exchanger 22 for heating the gaseous main medium 6 upstream of the supply section 7 of the cathode section K of the regeneratively operated fuel cell stack 1. By virtue of a second heat exchanger 22 arranged in this manner, the gas mixture consisting of the primary 18 and secondary flow 20 from the jet pump 16 can be heated to an optimal temperature for the fuel cell stack 1 and the efficiency of the fuel cell system 100 can advantageously be increased.

Figure 3:
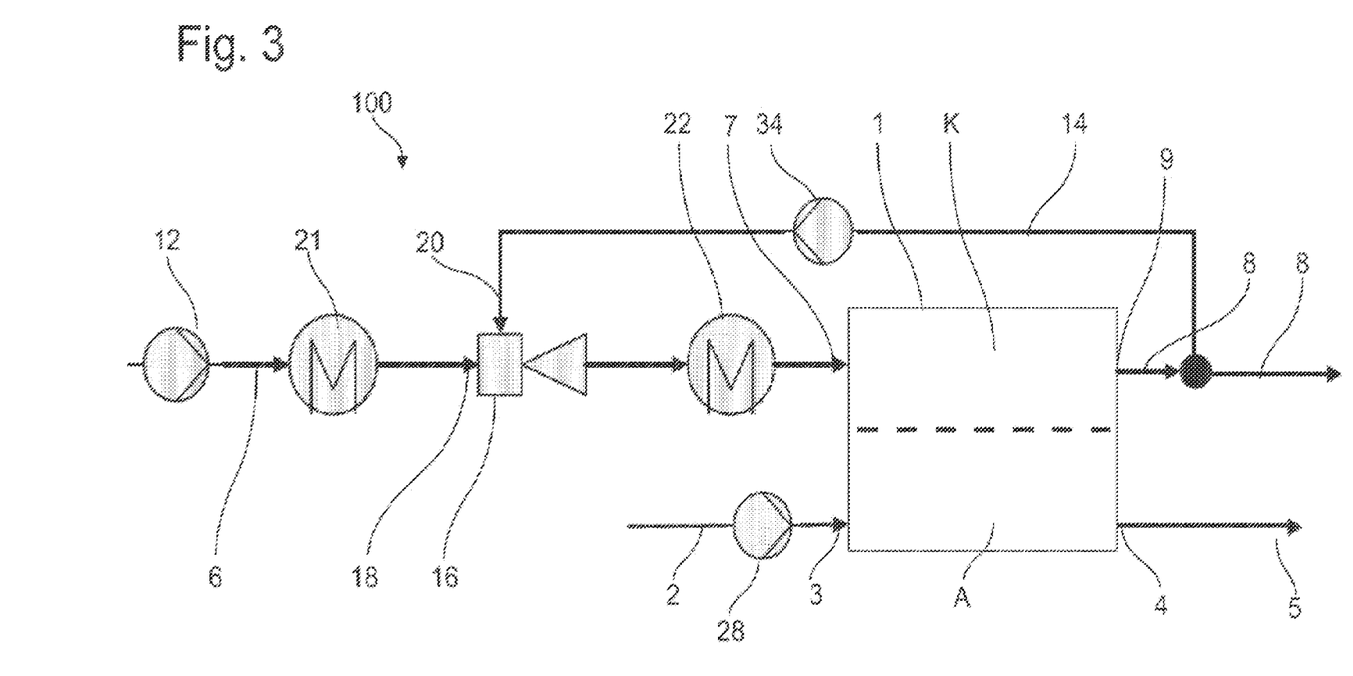
FIG. 3 is a circuit diagram of a fuel cell system comprising a jet pump, a recirculation section, an air supply fan, a first heat exchanger, a second heat exchanger and a recirculation fan.

FIG. 3 is a circuit diagram of a fuel cell system 100 according to the invention comprising a jet pump 16, a recirculation section 14, an air supply fan 28, a first heat exchanger 21, a second heat exchanger 22 and a recirculation fan 34. As an alternative to the fuel cell systems 100 in FIGS. 1 and 2, according to this embodiment of the invention, the liquid main medium 6 is not evaporated by means of an evaporator unit 11, but rather by means of a first heat exchanger 21. The liquid main medium 6 is then heated to a temperature just below the evaporation temperature such that main medium 6 evaporates on account of the pressure drop upon entry into the jet pump 16, which decreases the evaporation temperature of the main medium 6. As a result, the costs and effort for an evaporator unit 11 can be reduced to the lower costs and effort for a first heat exchanger 21. An air supply fan 28 is advantageously provided in order to control the amount of air 2 in the air supply section 3 and/or the amount of exhaust air 5 in the exhaust air section 4 and to optimise the fuel cell system 100. A recirculation fan 34 may be integrated in the fuel cell system 100 as an additional solution in order to provide an additional boost.

Figure 4:
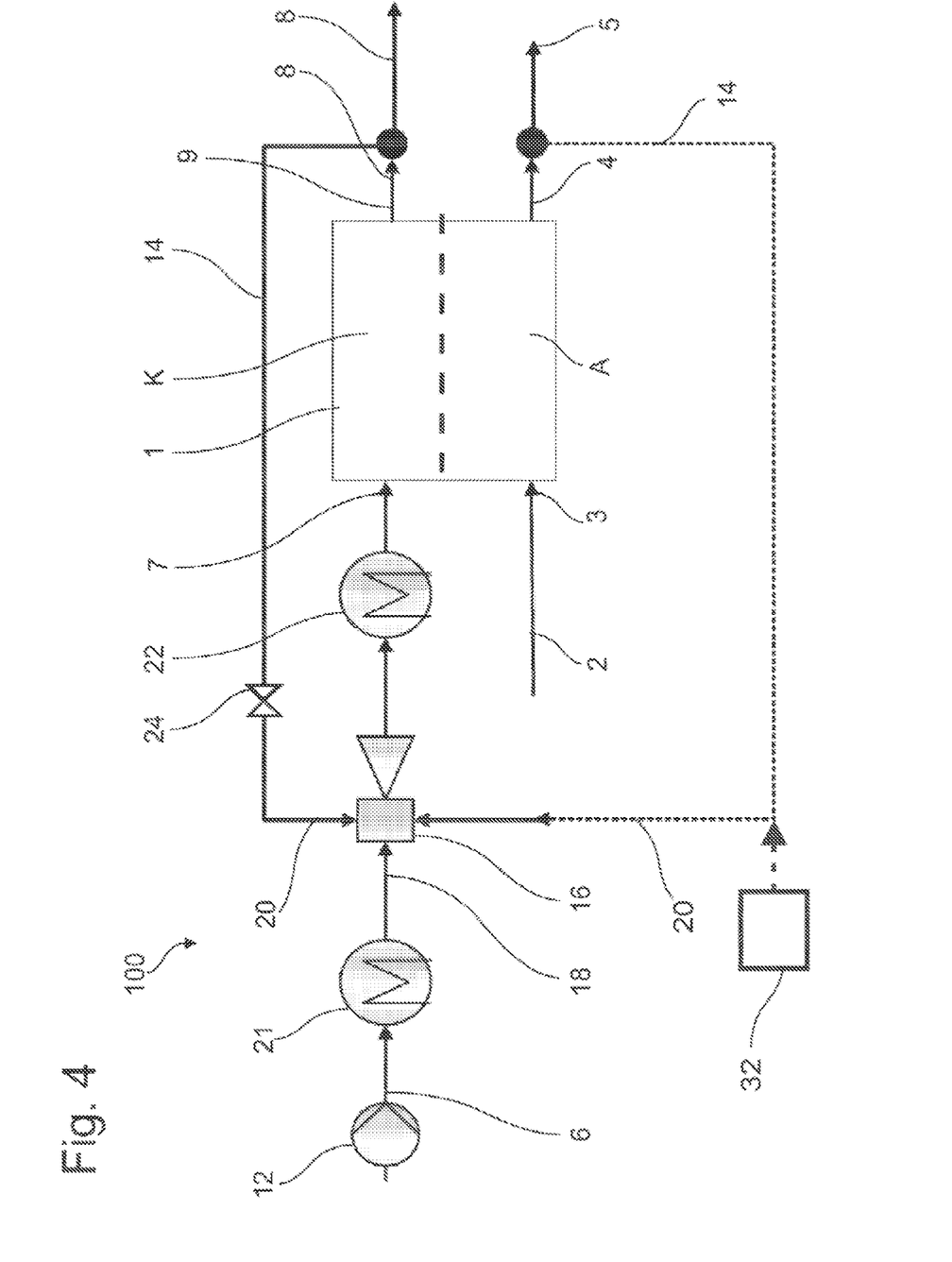
FIG. 4 is a circuit diagram of a fuel cell system comprising a jet pump, a recirculation section, a first heat exchanger, a second heat exchanger, a first valve, a storage volume and an additional recirculation section.

FIG. 4 is a circuit diagram of a fuel cell system 100 according to the invention comprising a jet pump 16, a recirculation section 14, a first heat exchanger 21, a second heat exchanger 22, a first valve 24, a storage volume 32 and an additional recirculation section 14 for recirculating exhaust air 5. In addition to the design features of the jet pump 16, the recirculation rate RR of the exhaust gas 8 can also be regulated by means of a first valve 24. At least one additional gas or gas mixture may be supplied from a storage volume 32 to the primary flow 18 and/or the secondary flow 20 of the jet pump 16. FIG. 4 shows a gas being supplied from a storage volume 32 to the secondary flow 20 of the recirculated exhaust air 5.

The invention allows other design principles in addition to the embodiments set out above. In other words, the invention should not be considered limited to the exemplary embodiments explained with reference to the figures.

LIST OF REFERENCE SIGNS

1 Fuel cell stack
2 Air
3 Air supply section
4 Exhaust air section
5 Exhaust air
6 Main medium
7 Supply section
8 Exhaust gas
9 Exhaust gas discharge section
11 Evaporator unit
12 Pump
14 Recirculation section
16 Jet pump
18 Primary flow
20 Secondary flow
21 First heat exchanger
22 Second heat exchanger
24 First valves
26 Second valve
28 Air supply fan
30 Useful gas supply section
32 Storage volume
34 Recirculation fan
36 Control unit 100 Fuel cell system
A Anode section
K Cathode section
RR Recirculation rate

The invention claimed is:

1. A fuel cell system (100), comprising:
at least at least one fuel cell stack (1) having:
 at least one cathode section (K) and
 at least one anode section (A),
an air supply section (3) for supplying air (2) to the anode section (A) of the fuel cell stack (1),
an exhaust air section (4) for discharging exhaust air (5) from the anode section (A) of the fuel cell stack (1),
a supply section (7) for supplying at least one main medium (6) to the cathode section (K) of the fuel cell stack (1),
and exhaust gas discharge section (9) for discharging exhaust gas (8) from the cathode section (K) of the fuel cell stack (1), and
a pump (12) for delivering the at least one main medium (6),
wherein the exhaust gas discharge section (9) is fluidically connected via a recirculation section (14) to the supply section (7) downstream of the pump (12) in order to recirculate exhaust gas (8),
wherein the recirculation section (14) is connected via a jet pump (16) to the supply section (7) in order to introduce recirculated exhaust gas (8) as the secondary flow (20) of the jet pump (16) into the at least one gaseous main medium (6) as the primary flow (18) of the jet pump (16),
wherein a first heat exchanger (21) for heating at least one liquid main medium (6) is arranged between the pump (12) and the jet pump (16);
wherein the at least one heated main medium (6) is heated by the first heat exchanger (21) such that the heated main medium (6) evaporates on account of the pressure drop in the jet pump (16).

2. The fuel cell system (100) according to claim 1, wherein an evaporator unit (11) for generating at least one gaseous main medium (6) from at least one liquid main medium (6) is arranged between the pump (11) and the jet pump (16).

3. The fuel cell system (100) according to claim 2, wherein the evaporator unit (11) is designed as a multi-stage evaporator unit (11).

4. The fuel cell system (100) according to claim 2, wherein the evaporator unit (11) is an electric evaporator unit or a heat-exchange evaporator unit.

5. The fuel cell system (100) according to claim 1, further comprising at least one second heat exchanger (22) for heating the main medium (6) is arranged between the jet pump (16) and the supply section (7) of the fuel cell stack (1).

6. The fuel cell system (100) according to claim 1, further comprising at least one first valve (24) arranged on the recirculation section (14), in order to adjust a recirculation rate (RR) of the exhaust gas (8).

7. The fuel cell system (100) according to claim 1, wherein the jet pump (16) comprises at least one second valve (26) for adjusting the primary flow (18) and/or the secondary flow (20).

8. The fuel cell system (100) according to claim 1, wherein the air supply section (3) comprises an air supply fan (28) for adjusting an amount of air (2) conveyed in the air supply section (3).

9. The fuel cell system (100) according to claim 1, wherein the fuel cell system (100) comprises a useful gas supply section (30), configured to supply the primary flow (18) and/or secondary flow (20) of the jet pump (16) with at least one additional gas or gas mixture from a storage volume (32), and/or recirculated exhaust air (5) via an additional recirculation section (14), from the exhaust air section (4).

10. The fuel cell system (100) according to claim 1, further comprising a recirculation fan (34) arranged in the recirculation section (14) in order to adjust an amount of the exhaust gas (8) of the fuel cell stack (1) recirculated in the recirculation section (14).

11. The fuel cell system (100) according to claim 6, wherein the at least one first valve (24) is arranged at the transition from the recirculation section (14) to the jet pump (16).

12. The fuel cell system (100) according to claim 2, wherein the evaporator unit (11) is designed as a two-stage evaporator unit (11).

13. The fuel cell system (100) according to claim 4, wherein the heat-exchange evaporator unit is heated by the exhaust gas (8) and/or the exhaust air (5) of the fuel cell system (100).

14. The fuel cell system (100) according to claim 5, wherein the at least one second heat exchanger (22) is a catalyst.

* * * * *